(12) United States Patent
Bussey et al.

(10) Patent No.: US 8,532,640 B2
(45) Date of Patent: *Sep. 10, 2013

(54) SOFTWARE KEY CONTROL FOR MOBILE DEVICES

(75) Inventors: Mark G. Bussey, Mound, MN (US); Fred C. Zimmerman, Deephaven, MN (US)

(73) Assignee: Positive Access Corporation, Eden Prairie, MN (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/845,598

(22) Filed: Jul. 28, 2010

(65) Prior Publication Data

US 2010/0293096 A1     Nov. 18, 2010

Related U.S. Application Data

(63) Continuation of application No. 11/653,500, filed on Jan. 16, 2007, now Pat. No. 7,792,522.

(60) Provisional application No. 60/758,752, filed on Jan. 13, 2006.

(51) Int. Cl.
*H04M 3/00* (2006.01)

(52) U.S. Cl.
USPC ........... 455/418; 455/411; 455/419; 455/420; 455/414.4; 705/14.64; 713/171; 713/168

(58) Field of Classification Search
USPC .................. 455/418, 419, 420, 414.4, 414.2, 455/410, 411; 709/219; 713/171, 168; 705/14.64
See application file for complete search history.

(56) References Cited

U.S. PATENT DOCUMENTS

| 3,154,761 A | 10/1964 | O'Gorman |
| 3,383,657 A | 5/1968 | Claassen |
| 3,569,619 A | 3/1971 | Simjian |
| 3,581,282 A | 5/1971 | Altman |
| 3,636,318 A | 1/1972 | Lindstrom et al. |

(Continued)

FOREIGN PATENT DOCUMENTS

| DE | 1952737 A1 | 6/1970 |
| DE | 3000560 A1 | 9/1981 |

(Continued)

OTHER PUBLICATIONS

Positive Access: Drivers License Software for Developers. Apr. 13, 2004. pp. 1-3, http://www.positiveaccess.com.

(Continued)

*Primary Examiner* — Kamran Afshar
*Assistant Examiner* — Sayed T Zewari
(74) *Attorney, Agent, or Firm* — Perkins Coie LLP

(57) ABSTRACT

A software key control system and method for mobile devices. When a customer orders a software product, the seller issues a temporary activation key which is posted to a key registration web server. The customer then locates the mobile device's unique device ID and accesses the web server to provide the temporary activation key. The web server creates a registration key based on the customer's temporary activation key and device ID. The registration key is transferred to the customer's mobile device and the customer can then register the ordered software product. The system and method of the present invention thereby automate the sale and distribution of keys for mobile devices.

20 Claims, 2 Drawing Sheets

(56) References Cited

U.S. PATENT DOCUMENTS

| | | |
|---|---|---|
| 3,702,392 A | 11/1972 | St. Jean |
| 3,764,742 A | 10/1973 | Abbott et al. |
| 3,868,057 A | 2/1975 | Chavez |
| 3,896,266 A | 7/1975 | Waterbury |
| 3,906,201 A | 9/1975 | Housman et al. |
| 3,956,615 A | 5/1976 | Anderson et al. |
| 3,988,570 A | 10/1976 | Murphy et al. |
| 4,137,058 A | 1/1979 | Schlom et al. |
| 4,138,057 A | 2/1979 | Atalla |
| 4,140,272 A | 2/1979 | Atalla |
| 4,186,871 A | 2/1980 | Anderson et al. |
| 4,193,131 A | 3/1980 | Lennon et al. |
| RE30,579 E | 4/1981 | Goldman et al. |
| 4,277,837 A | 7/1981 | Stuckert |
| 4,281,215 A | 7/1981 | Atalla |
| 4,304,961 A | 12/1981 | Campbell, Jr. |
| 4,315,101 A | 2/1982 | Atalla |
| 4,341,951 A | 7/1982 | Benton |
| 4,357,529 A | 11/1982 | Atalla |
| 4,369,361 A | 1/1983 | Swartz et al. |
| 4,438,824 A | 3/1984 | Mueller-Schloer |
| 4,450,348 A | 5/1984 | Stockburger et al. |
| 4,453,074 A | 6/1984 | Weinstein |
| 4,471,216 A | 9/1984 | Herve |
| 4,501,957 A | 2/1985 | Perlman et al. |
| 4,506,148 A | 3/1985 | Berthold et al. |
| 4,529,870 A | 7/1985 | Chaum |
| 4,590,470 A | 5/1986 | Koenig |
| 4,629,872 A | 12/1986 | Hallberg |
| 4,634,808 A | 1/1987 | Moerder |
| 4,634,846 A | 1/1987 | Harvey et al. |
| 4,636,622 A | 1/1987 | Clark |
| 4,659,914 A | 4/1987 | Kondo et al. |
| 4,684,791 A | 8/1987 | Bito |
| 4,689,477 A | 8/1987 | Goldman |
| 4,712,103 A | 12/1987 | Gotanda |
| 4,729,129 A | 3/1988 | Koerner |
| 4,731,841 A | 3/1988 | Rosen et al. |
| 4,752,676 A | 6/1988 | Leonard et al. |
| 4,807,287 A | 2/1989 | Tucker et al. |
| 4,811,393 A | 3/1989 | Hazard |
| 4,811,408 A | 3/1989 | Goldman |
| 4,812,628 A | 3/1989 | Boston et al. |
| 4,816,657 A | 3/1989 | Stockburger et al. |
| 4,879,747 A | 11/1989 | Leighton et al. |
| 4,882,779 A | 11/1989 | Rahtgen |
| 4,945,216 A | 7/1990 | Tanabe et al. |
| 4,982,072 A | 1/1991 | Takigami |
| 4,993,068 A | 2/1991 | Piosenka et al. |
| 4,995,081 A | 2/1991 | Leighton et al. |
| 5,007,089 A | 4/1991 | Matyas et al. |
| 5,012,077 A | 4/1991 | Takano |
| 5,016,192 A | 5/1991 | Ishido et al. |
| 5,042,686 A | 8/1991 | Stucki |
| 5,172,785 A | 12/1992 | Takahashi |
| 5,214,699 A | 5/1993 | Monroe et al. |
| 5,237,611 A | 8/1993 | Rasmussen et al. |
| 5,249,227 A | 9/1993 | Bergum et al. |
| 5,259,025 A | 11/1993 | Monroe et al. |
| 5,267,315 A | 11/1993 | Narita et al. |
| 5,284,364 A | 2/1994 | Jain |
| 5,287,181 A | 2/1994 | Holman |
| 5,321,751 A | 6/1994 | Ray et al. |
| 5,336,871 A | 8/1994 | Colgate, Jr. |
| 5,337,358 A | 8/1994 | Axelrod et al. |
| 5,337,361 A | 8/1994 | Wang et al. |
| 5,341,428 A | 8/1994 | Schatz |
| 5,367,148 A | 11/1994 | Storch et al. |
| 5,367,581 A | 11/1994 | Abel et al. |
| 5,386,103 A | 1/1995 | DeBan et al. |
| 5,422,468 A | 6/1995 | Abecassis |
| 5,429,361 A | 7/1995 | Raven et al. |
| 5,453,600 A | 9/1995 | Swartz |
| 5,469,506 A | 11/1995 | Berson et al. |
| 5,471,533 A | 11/1995 | Wang et al. |
| 5,490,217 A | 2/1996 | Wang et al. |
| 5,500,518 A | 3/1996 | Olzak et al. |
| 5,506,395 A | 4/1996 | Eppley |
| 5,513,019 A | 4/1996 | Cueli |
| 5,513,261 A | 4/1996 | Maher |
| 5,514,860 A | 5/1996 | Berson |
| 5,546,278 A | 8/1996 | Bethurum |
| 5,550,359 A | 8/1996 | Bennett |
| 5,553,143 A | 9/1996 | Ross et al. |
| 5,559,885 A | 9/1996 | Drexler et al. |
| 5,590,193 A | 12/1996 | Le Roux |
| 5,594,226 A | 1/1997 | Steger |
| 5,610,993 A | 3/1997 | Yamamoto |
| 5,635,981 A | 6/1997 | Ribacoff |
| 5,642,485 A | 6/1997 | Deaton et al. |
| 5,649,118 A | 7/1997 | Carlisle et al. |
| 5,651,066 A | 7/1997 | Moriyasu et al. |
| 5,661,805 A | 8/1997 | Miyauchi |
| 5,663,553 A | 9/1997 | Aucsmith |
| 5,668,874 A | 9/1997 | Kristol et al. |
| 5,679,940 A | 10/1997 | Templeton et al. |
| 5,694,471 A | 12/1997 | Chen et al. |
| 5,706,507 A | 1/1998 | Schloss |
| 5,712,472 A | 1/1998 | Lee |
| 5,717,776 A | 2/1998 | Watanabe |
| 5,721,777 A | 2/1998 | Blaze |
| 5,722,526 A | 3/1998 | Sharrard |
| 5,748,908 A | 5/1998 | Yu |
| 5,754,939 A | 5/1998 | Herz et al. |
| 5,770,849 A | 6/1998 | Novis et al. |
| 5,781,650 A | 7/1998 | Lobo et al. |
| 5,786,587 A | 7/1998 | Colgate, Jr. |
| 5,805,849 A | 9/1998 | Jordan et al. |
| 5,812,664 A | 9/1998 | Bernobich et al. |
| 5,838,812 A | 11/1998 | Pare, Jr. et al. |
| 5,845,256 A | 12/1998 | Pescitelli et al. |
| 5,848,426 A | 12/1998 | Wang et al. |
| 5,864,623 A | 1/1999 | Messina et al. |
| 5,879,747 A | 3/1999 | Murakami et al. |
| 5,991,429 A | 11/1999 | Coffin et al. |
| 6,070,147 A | 5/2000 | Harms et al. |
| 6,119,932 A | 9/2000 | Maloney et al. |
| 6,134,593 A * | 10/2000 | Alexander et al. ............ 709/229 |
| 6,148,091 A | 11/2000 | DiMaria |
| 6,169,542 B1 | 1/2001 | Hooks et al. |
| 6,196,460 B1 | 3/2001 | Shin |
| 6,363,387 B1 | 3/2002 | Ponnekanti et al. |
| 6,463,416 B1 | 10/2002 | Messina |
| 6,523,741 B1 | 2/2003 | DiMaria et al. |
| 6,920,437 B2 | 7/2005 | Messina |
| 2001/0034712 A1 * | 10/2001 | Colvin ............................ 705/52 |
| 2002/0143571 A1 | 10/2002 | Messina |
| 2005/0131829 A1 | 6/2005 | Messina |
| 2006/0184798 A1 * | 8/2006 | Yaldwyn et al. ............... 713/180 |
| 2007/0011748 A1 | 1/2007 | Tiwari |
| 2007/0112686 A1 | 5/2007 | Chatani et al. |
| 2008/0114685 A1 | 5/2008 | Leong et al. |

FOREIGN PATENT DOCUMENTS

| | | |
|---|---|---|
| DE | 4410459 A1 | 2/1995 |
| EP | 0187448 A2 | 7/1986 |
| EP | 0407207 A2 | 1/1991 |
| EP | 0683471 A1 | 11/1995 |
| EP | 0991027 A2 | 4/2000 |
| GB | 1546053 A | 5/1979 |
| GB | 2067322 A | 7/1981 |
| GB | 2136180 A | 9/1984 |
| GB | 2332973 A | 7/1999 |
| GB | 2359172 A | 8/2001 |
| JP | 0050075879 A | 6/1975 |
| JP | 63138462 A | 6/1988 |
| JP | 1055695 A | 3/1989 |
| JP | 3014973 A | 1/1991 |
| JP | 3100972 A | 4/1991 |
| JP | 7093648 A | 4/1995 |
| JP | 0080101868 | 4/1996 |
| JP | 09245231 A | 9/1997 |
| JP | 11316818 A | 11/1999 |
| WO | WO-9412372 A1 | 6/1994 |

OTHER PUBLICATIONS

Positive Access: IDecode DLL Active X, Positive Access Corporation, 1 page, 2004.
Positive Access. "What We Do" Driver's license software and equipment for scanning and reading drivers ID cards. 2 pages. Aug. 10, 2004.
Application Notes: The Mag-Tek Card Reader, Copyright 1992, Mag-Tek, Inc., 3 pages, Aug. 1992.
Positive Access. CardChecker Software, 2 pages, Aug. 22, 2003.
Intelli-Check, Inc. 1997, "Do You Really Know . . . Who is Old Enough?"
Intelli-Check, Inc. 1997, ID-Check Online, http://www.intellicheck.com, excerpts taken from http://intellicheck.com/news.htm and http://intellicheck.com/page14.htm.
Anonymous, "California Driver's License Readability Supported in New Percon Bar Code and Magnetic Stripe Decoder," PC Business Products, vol. 5, No. 7, Jul. 1993.
Anonymous, "Systems Copies Charge Transactions", Computer Retail Week, p. 56, Jun. 7, 1993.
Anonymous, "Multimedia's Future is Just a Touch Away", Report on IBM, vol. 10, No. 47, Dec. 1, 1993.
Specification, I Decode Parser (DLL) Software, Version I.07, Version K, Mar. 11, 2003.
Anonymous, "Technology Adds Functionality to ID Cards: Get Ready to Replace That Bulging Purse or Wallet-Full of Credit Cards with a Single, Multi-Function Card", Automatic I.D. News, p. 32, Apr. 1995.
Reese, Shelly, "Age Verification Units Counter Alcohol, Tobacco Sales to Minors: Devices read driver's licenses and approve or deny sale of age-restricted products", 2 pages, Jun. 1998.
Positive Access: Specification, IDecode R Parser Software Acive X DLL, 88 pages, Version 2.02, Rev. N, Copyright 2002-2005.
U.S. Appl. No. 11/447,240, filed Jun. 5, 2006, Inventor: Bussey.

* cited by examiner

SOFTWARE KEY CONTROL FOR MOBILE DEVICES

RELATED APPLICATION

This application is a continuation of U.S. application Ser. No. 11/653,500, entitled SOFTWARE KEY CONTROL FOR MOBILE DEVICES, filed Jan. 16, 2007 now U.S. Pat. No. 7,792,522 which claims the benefit of U.S. Provisional Application No. 60/758,752, filed Jan. 13, 2006, each of which is incorporated herein by reference in its entirety.

FIELD OF THE INVENTION

The present invention relates generally to software registration for mobile devices, and more particularly to an automated software key control for mobile devices.

BACKGROUND OF THE INVENTION

Mobile devices such as personal digital assistants (PDAs), handheld computers, and portable data terminals have operating systems that can be loaded into the hardware and run in a manner similar to a MICROSOFT WINDOWS® operating system a desktop or network computer. Examples of such systems are WINDOWS® MOBILE, WINDOWS® CE, and POCKET PC.

Because mobile devices are typically battery operated and all software and files may be completely removed, control and protection of application software installed on these devices rely on the device's hardware serial number in order to tie the application software to a particular device. Distributing software to a large number of devices by obtaining these serial numbers and integrating them into software "keys," however, is time consuming and requires serial number information prior to issuing a key, and can also require human intervention. Accordingly, there is a need for a system that simplifies software registration for mobile devices.

SUMMARY OF THE INVENTION

The present invention substantially addresses the aforementioned and other needs by providing a software key control system and method for mobile devices. The system and method of the invention automate the sale and distribution of keys for mobile devices.

In one embodiment, when a customer orders a software product from a seller, the seller issues a temporary activation key which is posted to a key registration web server. The customer then locates the mobile device's unique device ID and accesses the web server to provide the temporary activation key. The web server creates a registration key based on the customer's temporary activation key and device ID. The registration key is transferred to the customer's mobile device and the customer can then register the ordered software product, thus enabling the product.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
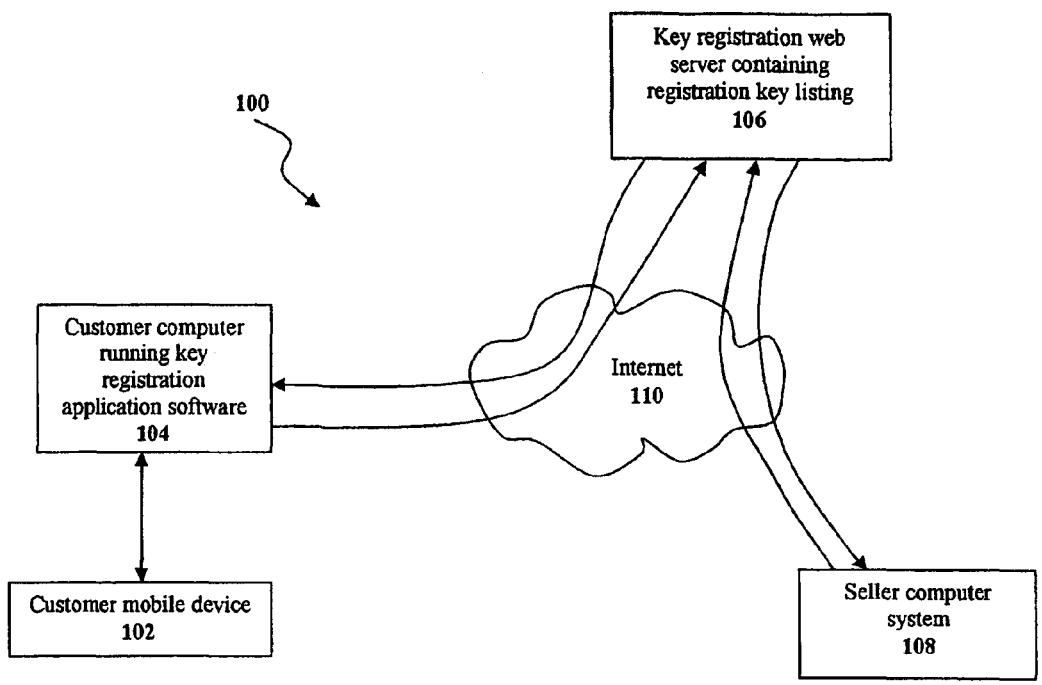
FIG. 1 is a diagram of a software key control system according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to FIG. 1, one embodiment of a software key control system 100 comprises a customer mobile device 102, a customer computer system 104, a key registration web server 106, and a seller computer system 108, all communicatively coupled to the Internet 110. In the embodiment of FIG. 1, mobile device 102 is communicatively coupled to computer system 104, which is in turn communicatively coupled, directly or via an intermediary network, to the Internet 110 and can transfer information to and from mobile device 102. Alternatively, mobile device 102 can be directly coupled to the Internet 110 or an intermediary network, omitting computer system 104 in another embodiment.

Mobile device 102 may be a cell phone, PDA, handheld computer, portable data terminal, or other similar computer and/or communication device, typically operating with a WINDOWS®.NET compact framework operating system. Operating systems can include, for example, WINDOWS® CE, POCKET PC, MOBILE 2003, and other similar systems.

Figure 2:
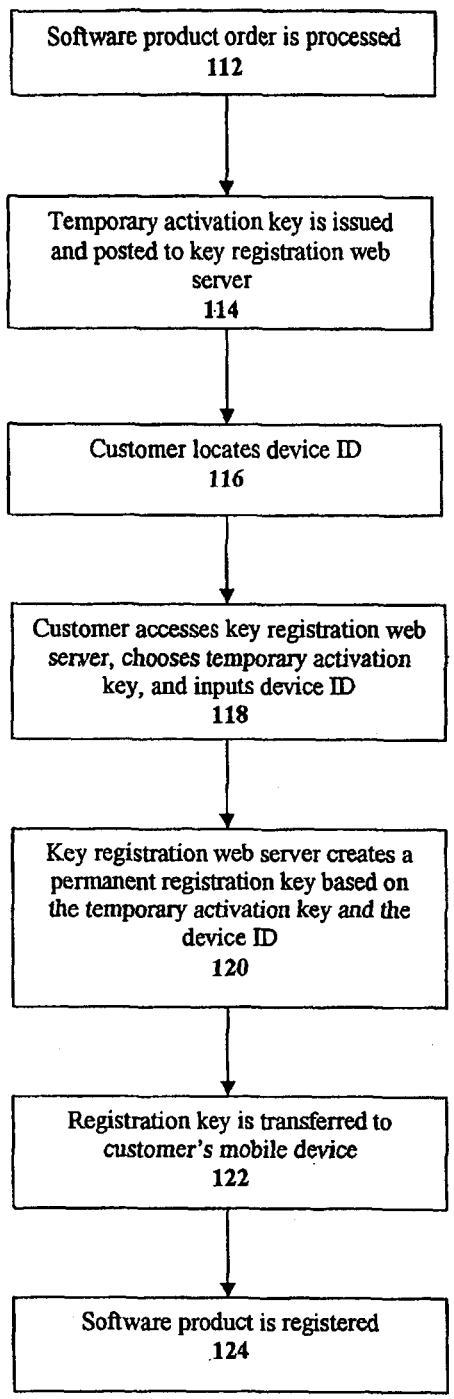
FIG. 2 is a flowchart of a software key control system and method according to one embodiment of the present invention.

Referring also to FIG. 2, a method of the invention is initiated when a customer orders a software product for the customer's mobile device 102 from the seller. The seller, via seller computer system 108, accepts and processes the software order at step 112. Upon accepting the order, the seller issues a temporary activation key at step 114. Each temporary activation key is unique to a customer order and will later allow the customer to obtain a registration key for the software product. Customer information and software version information denoting which versions of the software can be registered are included within each temporary activation key. The temporary activation key corresponding to the order is then sent via the Internet 110 from seller computer system 108 to a registration key list stored on registration key web server 106, where the customer will be able to access it. Registration key web server 106 is a server or web service that communicates with the key registration application software installed on customer mobile device 102, or on computer 104 in one embodiment, to allow registration keys to be obtained. Once the temporary activation key is posted on web server 106, a notice is sent to the customer indicating that the customer's key, or keys if multiple products are ordered, is available.

Before a customer can use a temporary activation key to obtain a registration key, the customer first locates mobile device 102's device ID at step 116. A device ID is generally a unique serial number or alphanumeric code stored in each mobile device 102 by the manufacturer that identifies that particular device and can be obtained electronically by software. The customer can locate the device ID by using key registration application software on device 102, or computer system 104, which then writes the device ID to a file in mobile device 102.

Next, the customer uses the key registration application software operating on computer system 104 or device 102 to access key registration web server 106 at step 118. The customer selects which temporary activation key to use from a list of keys for all products which the customer has ordered. Computer system 104 then transmits the device ID for mobile device 102 to web server 106. In another embodiment, mobile device 102 directly transmits the device ID to web server 106.

Using the temporary activation key and its associated customer and software version information, and the device ID, key registration web server 106 creates a permanent registration key at step 120 and stores the permanent key in the registration key list on server 106. The registration key is created using a key encryption algorithm selected by the seller and includes such information as the customer's ID, the version number of the software that can be upgraded to, and the device ID.

The key registration application software receives the permanent registration key from the registration key list and stores the permanent registration key on mobile device 102 at step 122, either directly or by first downloading to the customer's computer 104. After the registration key is stored in the customer's mobile device, the key registration application software or the software product itself will allow the user to register the product at step 124.

In addition to creating registration keys for newly purchased products, registration keys can also be created when devices, software, or other products are updated. This may be necessary because the temporary activation keys generally only allow registration keys to be issued for certain versions of a product. When a new version is released, the registration key will not allow access to the updated version. Accordingly, when the seller releases a new version of a software product, a code is put into the registration key list indicating the version number a customer is qualified to receive. When the customer connects to the key registration web service and requests an updated key, a new key is generated by the web service based on this code and is provided to the customer. The customer may then use the new key to register the new version of the software.

Registration keys can also be created for trial versions of a product. These trial keys may activate a software product for a specific period of time, and then disallow access upon expiration of that time period. Alternatively, a trial key may allow operation of the software only at a reduced capacity level, such as by disabling certain software functions.

The system also allows for the issuance of replacement keys. Replacement keys may be necessary when a customer damages the mobile device on which the software is located and needs to obtain a new device. Because the old registration key was keyed to the unique device ID of the customer's damaged mobile device, it will not work with a new device. A replacement key can be obtained by accessing the key registration web server and selecting the same temporary activation code as before. The key registration application software transmits the new device ID, and a new registration key is issued. Because this could be done with any number of devices even where there is no damaged device, this activity is noted in a report sent to the seller so that it can monitor replacement key activity for abuse.

The disclosure has been described with reference to various specific and preferred embodiments and techniques. However, it should be understood that many variations and modifications can be made while remaining within the spirit and scope of the disclosure.

The invention claimed is:

1. A computer-implemented method to manage software activation keys for mobile devices comprising the steps of:
   receiving a request from a mobile device to purchase a software product for use on the mobile device, wherein the request includes an identifier of the mobile device;
   creating a temporary activation key associated with the software product and the purchase, wherein the temporary activation key is unique to the purchase of the software product for the mobile device and comprises software product information and purchase information, including information associated with a customer of the mobile device;
   storing the temporary activation key;
   receiving a request to access the stored temporary activation key, wherein the request includes the identifier of the mobile device;
   creating a permanent registration key associated with the software product using the temporary activation key and the identifier of the mobile device;
   transmitting the permanent registration key to the mobile device; and
   registering the software product for use on the mobile device using the permanent registration key.

2. The method of claim 1, further comprising the step of transmitting a notification message to the mobile device indicating that the temporary activation key has been created.

3. The method of claim 1, wherein the step of creating a permanent registration key further comprises selecting a key encryption algorithm and using the key encryption algorithm to generate the permanent registration key.

4. The method of claim 1, further comprising the step of activating a full version of the software product for use on the mobile device after registering the software product.

5. The method of claim 1, further comprising the step of temporarily activating the software product for use on the mobile device after registering the software product.

6. The method of claim 1, further comprising the step of partially activating the software product for use on the mobile device after registering the software product.

7. The method of claim 1, further comprising the steps of
   receiving a request to issue a replacement registration key, wherein the request includes a new device identifier;
   creating a new permanent registration key associated with the software product using the new device identifier;
   transmitting the new permanent registration key to the mobile device; and
   registering the software product for use on the mobile device using the new permanent registration key.

8. The method of claim 7, further comprising the step of notifying the vendor of the software product of the issuance of the replacement registration key.

9. The method of claim 7, further comprising the step of revoking the permanent registration key.

10. A software key control system for mobile devices comprising:
    means for receiving a request from a mobile device to purchase a software product for use on the mobile device, wherein the request includes an identifier of the mobile device;
    computer-implemented means for creating a unique temporary activation key, wherein the temporary activation key is unique to the purchase of the software product for the mobile device and comprises software product information and purchase information, including information associated with a customer of the mobile device;

computer-implemented means for storing the temporary activation key;

computer-implemented means for receiving a request to access the stored temporary activation key, wherein the request includes the identifier of the mobile device;

computer-implemented means for creating a permanent registration key associated with the software product using the temporary activation key, the software product information, the purchase information, and the identifier of the mobile device; and computer-implemented means for transmitting the permanent registration key to the mobile device.

11. The system of claim 10, further comprising computer-implemented means for transmitting a notification message indicating that the temporary activation key has been created, wherein the notification message includes a network location at which the temporary activation key is stored.

12. The system of claim 10, wherein the computer-implemented means for creating a permanent registration key further comprises means for selecting a key encryption algorithm and means for using the key encryption algorithm to generate the permanent registration key.

13. The system of claim 10, further comprising computer-implemented means for registering the software product for use on the mobile device.

14. The system of claim 13, further comprising computer-implemented means for activating a full version of the software product for use on the mobile device after registering the software product.

15. The system of claim 13, further comprising computer-implemented means for temporarily activating the software product for use on the mobile device after registering the software product.

16. The system of claim 13, further comprising computer-implemented means for partially activating the software product for use on the mobile device after registering the software product.

17. The system of claim 10, further comprising computer-implemented means for issuing a replacement registration key using a new device ID.

18. The system of claim 17, further comprising means for notifying the provider of the software product of the issuance of the replacement registration key.

19. The system of claim 17, further comprising means for revoking the permanent registration key.

20. A non-transitory computer-readable storage medium encoded with computer-executable instructions to cause a computer system to manage software activation keys for mobile devices, the computer-readable storage medium comprising:

computer-executable instructions to respond to a request to purchase a software product for use on a mobile device, wherein the request includes an identifier of the mobile device;

computer-executable instructions to create a unique temporary activation key, wherein the temporary activation key is unique to the purchase of the software product for the mobile device and comprises software product information and purchase information, including information associated with a customer of the mobile device;

computer-executable instructions to store the temporary activation key;

computer-executable instructions to respond to a request to access the stored temporary activation key, wherein the request includes the identifier of the mobile device;

computer-executable instructions to create a permanent registration key associated with the software product using the temporary activation key, the software product information, the purchase information, and the identifier of the mobile device;

computer-executable instructions to send the permanent registration key to the mobile device; and computer-executable instructions to register the software product for use on the mobile device using the permanent registration key.

* * * * *

UNITED STATES PATENT AND TRADEMARK OFFICE
CERTIFICATE OF CORRECTION

PATENT NO. : 8,532,640 B2
APPLICATION NO. : 12/845598
DATED : September 10, 2013
INVENTOR(S) : Mark G. Bussey et al.

It is certified that error appears in the above-identified patent and that said Letters Patent is hereby corrected as shown below:

Title Page, Item (56), in column 2, under "Other Publications", line 1, delete "Drivers" and insert -- Driver's --, therefor.

Title Page 3, Item (56), in column 2, under "Other Publications", line 5, delete "Version I.07," and insert -- Version 1.07, --, therefor.

Signed and Sealed this
Twenty-fourth Day of December, 2013

Margaret A. Focarino
*Commissioner for Patents of the United States Patent and Trademark Office*